United States Patent Office 3,177,160
Patented Apr. 6, 1965

3,177,160
PREPARATION OF HYDRODESULFURIZATION
CATALYST
Armand J. de Rosset, Clarendon Hills, Ill., assignor to Universal Oil Products Company, Des Plaines, Ill., a corporation of Delaware
No Drawing. Original application Dec. 6, 1960, Ser. No. 73,989. Divided and this application Jan. 25, 1962, Ser. No. 168,815
4 Claims. (Cl. 252—465)

The present application is a division of my copending application Serial Number 73,989, filed December 6, 1960.

The present invention relates to the manufacture of alumina, and is directed toward the preparation of an alumina carrier material through a novel method which permits the alumina to be derived solely from aluminum sulfate as the source of aluminum. When employed as the carrier material for catalytically active metallic components, the alumina of the present invention unexpectedly results in a more active catalyst, and particularly with respect to those catalysts employed for the hydrodesulfurization of hydrocarbons and mixtures of hydrocarbons.

Alumina, in its many anhydrous forms, as aluminum oxide hydrate, or as aluminum hydroxide, is widely used throughout the chemical and petroleum industries. Alumina is often employed as a dehydrating, treating or purifying agent, or as a catalyst in and of itself. Alumina is most often utilized, however, as the carrier material for a wide variety of catalytically active metallic components in the manufacture of hydrocarbon conversion and hydrodesulfurization catalysts. One of the first commercial methods employed for the production of alumina involved the recovery of aluminum oxide from naturally-occurring clays and earths. This method involved a long, arduous process, and produced comparatively low-grade alumina which was relatively expensive. Many investigations have since been conducted in regard to a variety of processes for the purpose of producing a relatively inexpensive, high-purity alumina. For example, precipitation methods have been studied whereby a weak alkaline material, such as an aqueous solution of ammonium hydroxide, is added to an aqueous solution of an aluminum salt to form a precipitate of alumina. However, due to certain physical characteristics imparted to the resulting alumina, which inherently result from the use of ammonium hydroxide with some of the aluminum salts, the precipitate thus formed is difficult to convert to a form which is suitable for serving any of the functions previously described. Consequently, more expensive alkaline materials must be employed as precipitants, and the precipitation methods become difficult to justify economically. Similarly, although the alkaline precipitant may be suitable, not all of the salts of aluminum are advantageously employed. For example, when aluminum sulfate, readily obtainable in abundant quantities at comparatively low cost, is employed as the source of aluminum, the gelatinous precipitate resulting from the utilization of ammonium hydroxide is notoriously difficult to process to its final form. Washing to remove the various contaminants is extremely tedious, and although washing by filtration is employed, relatively long periods of time are required to produce an acceptable filter cake which can be dried readily, subsequently formed into the desired shape, and/or further treated for utilization as a carrier material for catalytically active metallic components. Other difficulties, arising as a result of utilizing aluminum sulfate as the source of aluminum, include the relatively low crushing strength of the final alumina particles, and, of greater importance, the relatively poor surface area characteristics which do not produce an alumina attractive for utilization as a carrier material for catalytically active metallic components.

The object of the present invention is to produce alumina from a solution of aluminum sulfate, the final alumina being substantially free from contaminating sulfate ions, by a method which avoids expensive procedures, and which alumina affords unexpected benefits when employed as the carrier material in the manufacture of hydrocarbon hydrodesulfurization catalysts. The method of the present invention involves precipitating a uniform, insoluble basic aluminum sulfate, and the subsequent hydrolysis of the same with a chlorine-containing compound prior to obtaining the filter cake which, upon drying and/or calcining, yields the finished alumina.

As hereinbefore stated, the method of the present invention produces an alumina which is advantageously employed as a carrier material in the manufacture of a variety of hydrocarbon conversion catalysts. In particular, the alumina of the present invention is readily adaptable for use in a composite containing metals selected from the group consisting of chromium, molybdenum, tungsten, iron, cobalt, nickel, ruthenium, rhodium, palladium, osmium, iridium, platinum, and mixtures of two or more. As hereinafter indicated, the alumina of the present invention is especially adaptable to the manufacture of hydrodesulfurization catalysts comprising at least one metallic component selected from the group consisting of Group VI–A and the iron-group of the Periodic Table.

Therefore, a broad embodiment of the present invention provides a method of preparing a hydrodesulfurization catalyst which comprises initially precipitating basic aluminum sulfate from a solution of aluminum sulfate, hydrolyzing the precipitate, while maintaining the resulting slurry at a pH less than about 7.0, with a chlorine-containing compound in an amount to result in a formula weight ratio of alumina-equivalent to chloride ion within the range of from about 3:1 to about 50:1, washing the resulting hydrolyzed precipitate until the washed precipitate contains less than about 2.0 percent by weight of sulfate, drying and calcining to produce alumina, combining at least one metallic component selected from the group of the metals from Groups VI–A and VIII of the Periodic Table with the calcined alumina and thereafter drying and calcining the resulting composite.

A more limited embodiment of the present invention provides a method of preparing a hydrodesulfurization catalyst which comprises precipitating basic aluminum sulfate from a solution of aluminum sulfate, hydrolyzing the resulting precipitate with hydrochloric acid in an amount to result in a formula weight ratio of alumina-equivalent to chloride ion within the range of from about 5:1 to about 15:1, maintaining the resulting slurry at a pH less than about 7.0, washing the resulting hydrolyzed precipitate until the washed precipitate contains less than about 2.0 percent by weight of sulfate, drying the washed precipitate and calcining the same at an elevated temperature, thereafter combining, with the calcined alumina, from about 6.0 percent to about 30.0 percent by weight of molybdenum and from about 1.0 percent to about 6.0 percent by weight of nickel, calculated as the elements thereof.

In the present specification and appended claims, the term "alumina-equivalent" is designated to mean that quantity of aluminum oxide ($Al_2O_3$) which would result if all the aluminum existing as basic aluminum sulfate were converted thereto. The "alumina-equivalent" is employed as a convenient means of determining the quantity of the chlorine-containing compound employed in the hydrolysis of the basic aluminum sulfate precipitated from the aluminum sulfate solution.

An essential feature of the present invention involves the precipitation, from a solution of aluminum sulfate, of basic aluminum sulfate. Although any suitable method may be employed in the formation of this particular precipitate, it has been found that a convenient, efficient means involves precipitation through the utilization of ammonium hydroxide at a constantly acidic pH level. During the commingling of the ammonium hydroxide with the aluminum sulfate, the pH of the resulting basic aluminum sulfate slurry is controlled at a level of about 6.0; that is, within the range of from about 5.5 to about 6.5. This procedure produces a basic aluminum sulfate having an aluminum to sulfate ratio of about 1.35. Following an initial filtration procedure, to remove the greater proportion of water, the filter cake is hydrolyzed by slurrying with a chlorine-containing compound, maintaining the pH at below about 7.0.

The hydrolysis of the basic aluminum sulfate is effected through the utilization of a suitable chlorine-containing compound, the latter being employed in an amount to result in a formula weight ratio of alumina-equivalent to chloride ion within the range of about 3:1 to about 50:1, and, preferably, within the intermediate range of 5:1 to about 15:1. Suitable chlorine-containing compounds include ammonium chloride, hydrochloric acid, etc., and are employed in such a manner as to maintain the pH of the resulting slurry at a level less than about 7.0. The hydrolyzed basic aluminum sulfate slurry is refiltered and washed, preferably with an ammoniacal solution, until the sulfate ion concentration of the resulting filter cake is below a level of about 2.0 percent by weight. Upon drying, at a temperature of from about 100° C. to about 400° C., the alumina is in the form of talc-like powder having a particle size of about five to about ten microns. The alumina is thereafter subjected to high-temperature calcination, usually at a level of about 400° C. to about 800° C., and in the presence of a free-oxygen containing atmosphere, such as air. The calcined alumina is then formed into the desired size and/or shape, such as pills, pellets, extrudates, cakes, etc. When formed into ⅛-inch by ⅛-inch cylindrical pills, the alumina of the present invention has an apparent bulk density less than about 0.60 gram/cc., a surface area of about 200 square meters per gram, a pore volume of about 0.428 and a pore diameter of about 80 Angstrom units.

When utilized as the carrier material in the manufacture of hydrocarbon hydrodesulfurization catalysts, the calcined alumina particles may be combined with the metallic components in any suitable, desired manner. A particularly convenient method of incorporating the catalytically active metallic components with the carrier material involves impregnating techniques utilizing water-soluble compounds of the metals to be composited therewith. Suitable water-soluble compounds include nickel nitrate hexahydrate, nickel chloride, chloroplatinic acid, molybdic acid, chloropalladic acid, dinitritodiamino platinum, etc. The metallic components will generally be composited with the calcined alumina in amount up to about 30.0 percent by weight, calculated as the elements thereof. Lesser quantities of the platinum-group metals will be utilized, and will lie within the range of from about 0.01 percent to about 2.0 percent by weight. As hereinafter indicated, the alumina of the present invention provides an excellent carrier material for metallic components having hydrodesulfurization activity. Such metallic components include the metals of Groups VI–A and VIII of the Periodic Table, and will generally comprise at least one metallic component selected from the iron-group. The metals from Group VI–A will be employed within the range of from about 1.0 percent to about 30.0 percent by weight; when the Group VI–A metallic component is molybdenum, the concentration thereof will be from about 6.0 percent to about 30.0 percent by weight. The iron-group metallic components are employed in quantities less than that of the Group VI–A metallic component, within the range of from about 1.0 percent to about 6.0 percent by weight. The hydrodesulfurization catalyst, for example containing both molybdenum and nickel, may be prepared in any suitable manner, the utilization of impregnating techniques being particularly preferred. The impregnation may be effected in a single step or in two individual steps with intervening high-temperature treatment. Following the impregnation of the alumina carrier material with the catalytically active metallic components, the alumina is dried at a temperature of from about 100° C. to about 300° C., and thereafter subjected to a high-temperature calcination treatment, in the presence of air, at a temperature of from about 400° C. to about 800° C. The metallic components, after being combined with the alumina, and following the last-mentioned calcination procedure, may thereafter be treated in such a manner as to be caused to exist within the composite in any desired state, either as the elements, or as compounds thereof. Thus, the composite may be sulfided, as with hydrogen sulfide, whereby the metals exist as sulfides; the composite may be hydrogen-treated such that the metals exist in their most reduced form. In any event, the state of the metallic components, within the final composite, is not considered to be a feature limiting the broad scope and spirit of the appended claims.

The hydrodesulfurization catalyst, prepared by utilizing the alumina of the present invention, may be employed to great advantage in processes designed to effect the preparation of saturated hydrocarbon charge stocks substantially free from combined sulfur and nitrogen. Recent developments within the petroleum industry have indicated that catalytic reforming processes utilizing a catalyst consisting primarily of platinum and alumina, and particularly a composite which also contains combined halogen, are especially useful in the reforming of hydrocarbons and mixtures of hydrocarbons for the purpose of increasing the anti-knock characteristics thereof. Through the proper selection of operating conditions, these platinum-containing catalysts may be utilized for a relatively extended period of time when processing hydrocarbon fractions comparatively free from various contaminants. However, when effecting these reactions while processing charge stocks containing excessive concentrations of contaminants, selective poisoning of the platinum-containing catalyst results, accompanied by a significant decline in the activity and stability thereof.

Hydrodesulfurization catalysts are very effective in purifying hydrocarbon charge stocks in a manner whereby metallic contaminants are removed, combined sulfur and nitrogen are converted to hydrogen sulfide and ammonia, and olefinic hydrocarbons are saturated to form paraffins and naphthenes. It becomes difficult to effect a successful reforming process on an unsaturated charge stock containing large quantities of sulfurous and nitrogenous compounds; the unsaturated compounds exhibit the tendency to polymerize, forming a carbonaceous material which becomes deposited upon the platinum-containing catalyst. The sulfur and nitrogen compounds are caused to form hydrogen sulfide and ammonia, both of which exhibit adverse effects toward the reforming catalyst.

The following examples are given for the purpose of illustrating the process of the present invention, and indicate the method of preparing highly active alumina from a solution of aluminum sulfate, which alumina was employed as a carrier material for the hydrodesulfurization catalysts utilized in the examples. It is understood that slight modifications of the process flow and equipment, as well as insignificant changes in the conditions, reagents and concentrations employed within these examples, are not considered to be outside the broad scope of the present invention.

In these examples, reference is made to a "standard relative activity" test method. The relative activity of a particular catalyst is defined as the ratio of the space velocity required to result in a given product improvement, while employing the test catalyst, to the space velocity required to yield the same degree of product improvement while employing a standard catalyst, which relative activity is expressed as a percentage. The catalyst employed as the standard relative catalyst was an alumina-cobalt-molybdenum composite consisting of about 2.2 percent by weight of cobalt and about 5.9 percent by weight of molybdenum, this catalyst being typical of the hydrodesulfurization catalysts currently manufactured. The product quality improvement was measured in terms of the residual basic nitrogen content of the liquid product: since the removal of nitrogenous compounds is that function of the catalyst most difficult to achieve, the relative activity of the catalytic composite is more logically based thereon, rather than on an improvement in either the sulfur concentration or the quantity of olefinic hydrocarbons remaining in the hydrocarbon charge. The relative activity test method consists essentially of processing a thermally-cracked California naphtha; this charge stock is characterized by an API gravity of 43.3° at 60° F., an initial volumetric distillation point of 290° F., a 50% distillation point of 320° F., and an end boiling point of 392° F. The thermally-cracked naphtha contains 1.46 percent by weight of sulfur, 240 p.p.m. of basic nitrogen, and has a bromine number of 61, the latter indicating that the naphtha contains a significant quantity of olefinic hydrocarbons. The charge stock is passed into a reaction zone fabricated from 1-inch, schedule 80, type 316 stainless steel, equipped with a thermocouple well, to which perforated baffle plates are fastened to serve as the vaporization, preheating and mixing zone for hydrogen and the liquid hydrocarbon charge. The reactor contains a single catalyst bed of about 50 cubic centimeters, and is maintained under an imposed hydrogen pressure of about 800 pounds per square inch, hydrogen being recycled therethrough at a rate of about 3000 standard cubic feet per barrel of liquid charge; the inlet temperature to the catalyst in each instance is 700° F. Three distinct test procedures are effected at various liquid hourly space velocities within the range of about 2.0 to about 10.0. The liquid product effluent, upon which the product inspections are made, is collected over a period of operation of about four to about seven hours. The basic nitrogen concentration in each of the three liquid products are plotted on a logarithmic scale against the reciprocals of the three space velocities employed. From the resulting curve, drawn through the three points, a determination is made of the reciprocal of the space velocity required to yield a liquid product having a residual basic nitrogen content of two p.p.m. The relative activity of the test catalyst is derived from the ratio of the reciprocal space velocity to yield two parts per million basic nitrogen, in regard to the standard catalyst, and compared to that of the catalyst being tested. The ratio is multiplied by a factor of 100, and a relative activity factor greater than 100 indicates a test catalyst having a greater activity than the standard catalyst; obviously, a catalyst having a relative activity less than 100 is less active than the primary standard catalyst.

*Example I*

The catalyst employed in this example was prepared by precipitating basic aluminum sulfate from a solution of aluminum sulfate by simultaneously commingling the latter with ammonium hydroxide at a controlled pH of about 6.0. Following an initial filtration step, the resulting filter cake was intimately commingled with a hot (178° F.) aqueous solution of 28.0 percent by weight of ammonium hydroxide in an amount to raise the pH of the resulting slurry to a level of about 8.0. The resulting slurry was again filtered, and again commingled with ammonium hydroxide to raise the pH to a level of 8.0; this procedure was effected a total of five times, the final filter cake being dried at a temperature of about 150° C., and thereafter calcined, in an atmosphere of air, at a temperature of about 500° C. The calcined alumina was formed into ⅛-inch by ⅛-inch cylindrical pills, a 50-gram portion of the pills being impregnated with nickel and molybdenum. The impregnating solution consisted of 34.2 grams of molybdic acid (85.0 percent MoO₃), 21.0 ml. of water and 42.0 ml. of a 28.0 percent by weight solution of ammonium hydroxide. This molybdenum-containing solution was then commingled with a solution of 16.8 grams of nickel nitrate hexahydrate, 13.7 grams of nickel chloride hexahydrate, and about 50 ml. of ammonium hydroxide. Sufficient ammonium hydroxide was then added to the mixture to increase the total volume thereof to about 190 ml. Following the impregnation, with the foregoing solution, the 50 grams of alumina were dried and calcined for a period of one hour at a temperature of 1100° F. The final catalyst contained 8.6 percent by weight of nickel oxide and 29.1 percent by weight of molybdenum oxide, computed on the basis of the weight of alumina. When subjected to the standard relative activity test procedure, hereinbefore described, this catalyst indicated a relative activity of 135.

*Example II*

The catalyst of the present example was prepared by precipitating basic aluminum sulfate from 4232 ml. of an aluminum sulfate solution, having a specific gravity of about 1.28, using 1042 ml. of 28 percent by weight solution of ammonium hydroxide. The solutions of aluminum sulfate and ammonium hydroxide were added continuously and simultaneously to a large beaker at such rates as to maintain the pH of the resulting basic aluminum sulfate slurry at about 6.0. The initial filter cake was re-slurried with 45 ml. of concentrated hydrochloric acid in an additional 250 ml. of water at a pH of about 7.0. This quantity of hydrochloric acid was sufficient to result in a formula weight ratio of alumina-equivalent to chloride ion of about 8.0. The slurry was again filtered, and subsequently washed with hot (178° F.) ammonium hydroxide, which procedure was repeated a total of five times. The final alumina filter cake was dried at a temperature of about 150° C. and thereafter calcined, at a temperature of about 500° C., in an atmosphere of air. 40 grams of ⅛-inch by ⅛-inch alumina pills, prepared from the foregoing calcined alumina, were impregnated with an impregnating solution containing 9.4 grams of molybdic acid in 9.0 ml. of water, 12 ml. of a 28 percent by weight solution of ammonium hydroxide, 4.55 grams of nickel nitrate hexahydrate and 4.0 grams of nickel chloride hexahydrate in sufficient ammonium hydroxide to bring the total volume of the mixture to 74 millimeters. Following the impregnation, the composite was dried at a temperature of 150° C. and oxidized, in an atmosphere of air, at a temperature of 1100° F. Based upon the weight of the alumina carrier material, the catalyst contained 3.0 percent by weight of nickel oxide and 10.0 percent by weight of molybdenum oxide. When subjected to the standard relativity test procedure hereinabove described, this catalyst indicated a relative activity of 162.

The hydrodesulfurization catalyst, utilizing the alumina prepared in accordance with the method of the present invention (Example II), indicated a relative activity 27 units greater than that indicated by the catalyst prepared in accordance with Example I, the latter not being hydrolyzed in the presence of a chlorine-containing compound. It is significant that the catalyst of Example I contained approximately three times the concentration of catalytically active metallic components than the catalyst prepared with the alumina of the present invention. Of further significance is the fact that the catalyst of Example I, when analyzed for carbon deposition resulting from the standard relative activity test, indicated 1.95 percent by weight of carbon; the catalyst of Example II indicated a lesser carbon concentration of 1.70 percent by weight.

The foregoing examples clearly indicate the method of the present invention in preparing alumina from aluminum sulfate, which alumina is advantageously employed in the manufacture of hydrocarbon hydrodesulfurization catalysts. The alumina of the present invention, hydrolyzed in the presence of a chlorine-containing compound, resulted in a more active catalyst, although having a significantly lesser quantity of carbon deposited thereupon.

I claim as my invention:

1. A method of preparing a hydrodesulfurization catalyst which comprises initially precipitating basic aluminum sulfate from a solution of aluminum sulfate, hydrolyzing the precipitate, while maintaining the resulting slurry at a pH less than about 7.0, with a chlorine-containing compound in an amount to form a slurry having a formula weight ratio of alumina-equivalent to chloride ion within the range of from about 3:1 to about 50:1, washing the resulting hydrolyzed precipitate until the washed precipitate contains less than about 2.0 percent by weight of sulfate, drying and calcining to produce alumina, combining at least one metallic component selected from the group consisting of the metals of Groups VI–A and VIII of the Periodic Table with the calcined alumina and thereafter drying and calcining the resulting composite.

2. The method of claim 1 further characterized in that said catalyst comprises molybdenum and a metallic component from the iron-group metals.

3. The catalyst of claim 2 further characterized in that said molybdenum is present in an amount of from about 6.0 percent to about 30.0 percent by weight of the alumina, and said iron-group metallic component is present in an amount of from about 1.0 percent to about 6.0 percent by weight of the alumina, said metallic components calculated as the elements.

4. A method of preparing a hydrodesulfurization catalyst which comprises precipitating basic aluminum sulfate from a solution of aluminum sulfate, hydrolyzing the resulting precipitate with hydrochloric acid in an amount to form a slurry having a formula weight ratio of alumina-equivalent to chloride ion within the range of from about 5:1 to about 15:1, maintaining the resulting slurry at a pH less than about 7.0, washing the resulting hydrolyzed precipitate until the washed precipitate contains less than about 2.0 percent by weight of sulfate, drying the washed precipitate and calcining the same at an elevated temperature, thereafter combining with the calcined alumina, from about 6.0 percent to about 30.0 percent by weight of molybdenum and from about 1.0 percent to about 6.0 percent by weight of nickel, calculated as the elements and based on the weight of the alumina.

References Cited by the Examiner
UNITED STATES PATENTS

| | | | |
|---|---|---|---|
| 2,867,581 | 1/59 | Nahin | 252—470 X |
| 2,914,488 | 11/59 | Gilbert | 252—463 X |
| 3,027,232 | 3/62 | Michalko | 252—463 X |
| 3,066,012 | 11/62 | Wilson et al. | 252—463 X |

MAURICE A. BRINDISI, *Primary Examiner.*